United States Patent

[11] 3,545,716

| [72] | Inventor | Albert J. Colautti<br>Windsor, Ontario, Canada |
|---|---|---|
| [21] | Appl. No. | 729,274 |
| [22] | Filed | May 15, 1968 |
| [45] | Patented | Dec. 8, 1970 |
| [73] | Assignee | General Motors Corporation<br>Detroit, Michigan<br>a corporation of Delaware |

[54] TRACK STRUCTURE FOR SEAT ADJUSTER
2 Claims, 7 Drawing Figs.

[52] U.S. Cl. ........................................ 248/430,
    308/3.8, 308/215, 308/188
[51] Int. Cl. ........................................ F16m 13/00
[50] Field of Search........................... 248/420,
    429, 430; 308/3, 8, 6, 202, 215, 188

[56] References Cited
UNITED STATES PATENTS

| 2,708,959 | 5/1955 | Dingman et al. | 308/3.8 |
|---|---|---|---|
| 2,796,113 | 6/1957 | Lyon et al. | 248/430 |
| 3,143,758 | 8/1964 | Dunham | 308/3.8 |
| 3,279,737 | 10/1966 | Krause | 248/430 |
| 595,328 | 12/1897 | Miller | 308/215 |
| 1,622,985 | 3/1927 | Weibull | 308/215 |

FOREIGN PATENTS

| 779,532 | 7/1957 | Great Britain | 248/430 |
|---|---|---|---|
| 1,457,675 | 9/1966 | France | 308/3.8 |
| 890,810 | 11/1943 | France | 308/215 |
| 1,024,955 | 1/1953 | France | 308/215 |

Primary Examiner—Marion Parsons, Jr.
Attorneys—J. L. Carpenter and E. J. Biskup

ABSTRACT: A track structure for a vehicle seat adjusting mechanism having opposed and relatively slidable upper and lower channel members. The channel members are provided with laterally extending flanges that are interlocked and have bearing means interposed therebetween. Spring means which take the form of a cylindrical roller serve to continuously bias the channel members apart so as to preload the bearing means and compensate for wear and/or manufacturing deficiencies.

PATENTED DEC 8 1970
3,545,716
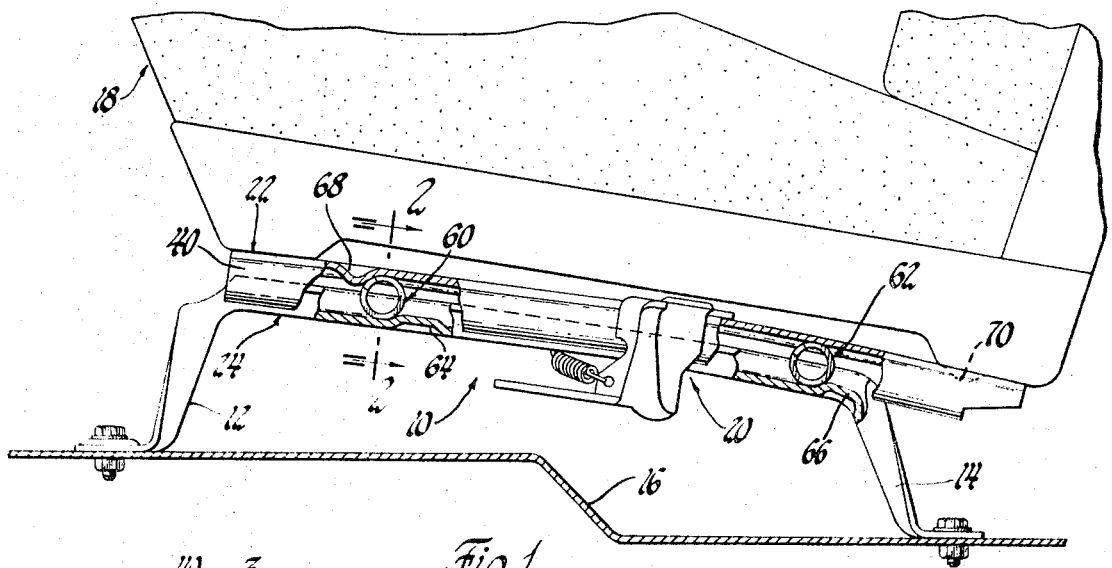
Fig.1
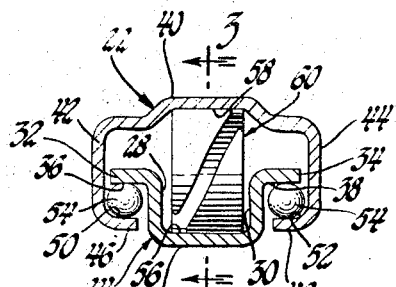
Fig.2
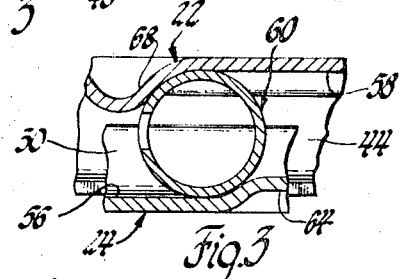
Fig.3
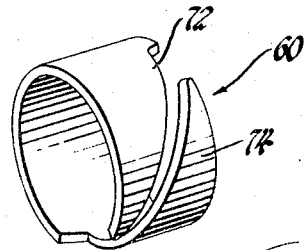
Fig.4
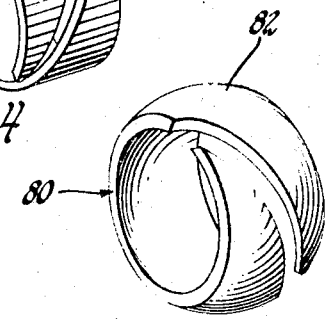
Fig.5
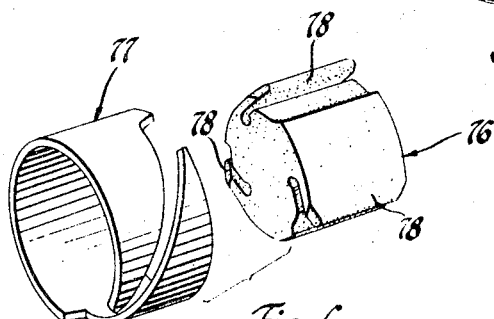
Fig.6
Fig.7
INVENTOR
BY Albert J. Colautti
E.J. Biskup
ATTORNEY

TRACK STRUCTURE FOR SEAT ADJUSTER

Automobile seats are usually mounted on spaced slidable track structures which support the seat for horizontal movement between fore-and-aft positions, and are provided with a locking mechanism for holding the seat in an adjusted position. Present production structures of this type are made with upper and lower relatively slidable channel members having spaced laterally extending flanges at the sidewalls which overlap each other and are interconnected so as to prevent the channels from separating. A pair of ball bearings are disposed within the channel members between the flanges together with a pair of rollers so as to maintain the members in slidable relationship and to take vertical and lateral loads.

One difficulty with the above-described track structures is that close tolerances must be held during manufacture of the channel members so when assembled with the ball bearings and rollers, the members are firmly held together without requiring an undue amount of channel effort during operation. Another drawback is that even in cases where proper manufacturing tolerances are maintained, the track structure after some use tends to have grooves formed in the flanges by the hardened balls resulting in elimination of the close fit required to prevent rattles and chucking of the adjuster during operation.

Accordingly, the objects of this invention are to provide a slidable track structure which is inexpensive to manufacture and durable in operation; to provide a slidable track structure having relatively movable interlocked channel members with spring means interposed therebetween which provide a biasing force to preload the usual bearing means incorporated with the track structure and thereby compensate for wear and manufacturing irregularities; to provide a seat adjuster having the usual upper and lower channel members and bearing means therebetween and which incorporates a spring device having the dual function of serving as a roller and biasing the channel members apart so that all bearing surfaces maintain firm contact with the bearing means, and to provide a track assembly for supporting a vehicle seat for movement along a substantially horizontal axis between fore-and-aft positions and in which the track assembly is characterized by having a spring member in the form of a roller which can support the vertical loading of the seat and its occupants and also continuously urge the channel members apart so as to maintain contact between the bearing means and the bearing surfaces of the track structure.

A complete understanding of the present invention will be derived from the following detailed description when taken with the drawing in which:

FIG. 1. is an elevational view showing a seat adjuster having a track structure made in accordance with the invention and supporting a vehicle seat;

FIG. 2 is a cross-sectional view taken on line 2-2 of FIG. 1;

FIG. 3 is a view taken on line 3-3 of FIG. 2;

FIG. 4 is an isometric view showing the details of construction of the roller incorporated with the track structure disclosed in FIG. 1;

FIG. 5 shows the roller of FIGS. 1 through 4 incorporating an expandable insert member;

FIG. 6 is an exploded view showing in perspective the construction of the roller and expandable insert member of FIG. 5; and FIG. 7 shows a modified form of the roller disclosed in FIGS. 2 through 6.

Referring now to the drawing and more particularly to FIG. 1 thereof, a seat adjuster 10 made in accordance with the invention is shown having horizontally spaced legs 12 and 14 secured to the floor pan 16 of a motor vehicle. The seat adjuster 10 has fastened thereto the usual vehicle seat 18 and incorporates a locking mechanism 20 which serves to hold the seat in an adjusted position. Details of the locking mechanism 20 are not shown but it will be understood that it may take the usual form such as having a pivoted tongue which is selectively movable into engagement with teeth formed with the adjuster mechanism for securely maintaining the adjuster and accordingly the associated seat in an immovable position. It will also be understood that the seat adjuster 10 is located adjacent one side of the seat 18 and, although not shown, a similar device is located adjacent the other side of the seat and is connected with the adjuster 10 for concomitant operation.

More specifically, the track structure of the seat adjuster 10 comprises a pair of generally U-shaped channel members 22 and 24, the lower one of which is formed integrally with the legs 12 and 14 and, as seen in FIG. 2, includes a base section 26 which is formed with upwardly extending and laterally spaced sidewalls 28 and 30. The respective sidewalls 28 and 30 are formed with outwardly extending flange members 32 and 34 having bearing surfaces 36 and 38. The upper channel member 22 similarly has a base section 40 which merges with downwardly extending laterally spaced sidewalls 42 and 44 which respectively terminate with inwardly extending flange members 46 and 48 having bearing surfaces 50 and 52. Located between the opposed bearing surfaces of each pair of flange members 32, 46 and 34, 48 are a pair of ball bearings 54 which are caged in the usual fashion and located adjacent to the forward and the rearward end of the adjuster. The inner flat surfaces 56 and 58 of the base sections 26 and 40 formed with the channel members 24 and 22, respectively, also serve as bearing surfaces and have located therebetween a pair of rollers 60 and 62 which are identically formed and positioned between the channel members so as to equally take the vertical loading placed on the adjuster due to the weight of the seat and the occupant. As best seen in FIG. 1, roller 60 is located adjacent the forward end of the adjuster, while roller 62 is located adjacent the rear. Moreover, it will be noted that the lower channel member 24 has raised sections 64 and 66, while the upper channel member 22 has depressed sections 68 and 70 formed therewith which act as stops when they engage the rollers 60 and 62 and thereby determine the extent of seat travel along the track structure. As seen in FIG. 1, the roller 60 is wedged between sections 64 and 68 and the seat is located in the extreme rearward position. Thus, it should be apparent that the seat adjuster 10 permits the vehicle seat 18 to travel between fore-and-aft positions with the ball bearings 54 and rollers 60, 62 serving as means for facilitating such movement and absorbing the vertical and lateral thrust loads which may be imposed on the devices.

As alluded to hereinbefore, in order to obtain proper operation of the seat adjuster track structure, the bearing surfaces 36, 38, 50, 52, 56 and 58 contacting the ball bearings 54 and the rollers 60 and 62 should continuously be in firm contact without imposing undue frictional drag which could require an excessive amount of channel effort for shifting the seat 18 between the adjusted positions. In order to achieve this result, close tolerances must be maintained in present adjusters between bearing surfaces 50 and 58, 52 and 58, 36 and 56, and also bearing surfaces 38 and 56. Such tolerances usually are in the neighborhood of 0.0010 inch and inasmuch as the channel members involve a number of bending operations, it has been found that such close tolerances are difficult to be held. As a result, it frequently is found that when the seat adjuster is assembled, proper mating of the various components thereof is not obtained resulting in either a loose assembly subject to rattles or one which is so tight that excessive channel effort is required to obtain proper adjustment thereof.

In an effort to alleviate the problem explained above the present invention incorporates rollers 60 and 62 which serve as spring devices. In this regard, it will be noted that each roller 60 and 62 is formed from a sheet of spring metal and includes symmetrically and oppositely disposed offset tongue portions 72 and 74 so as to permit the formation of a cylindrical member having an outer diameter greater than the distance between the bearing surfaces 56 and 58. Depending upon the amount of vertical loading required for the rollers to assume, will determine the thickness of the metal being used, the important consideration being that the rollers be capable of supporting the vertical load placed on the adjuster without imposing an undue amount of biasing force between the channel members.

As described above, the outer diameter of each of the rollers 60 and 62 is greater than the distance between the bearing surfaces 56 and 58. Accordingly, when the seat adjuster 10 is assembled, a partial compression of the rollers occurs which is permitted because of the gap provided between the tongue members 72 and 74 as shown in FIG. 2. The rollers, of course, will therefore exert a biasing force against the opposed bearing surfaces of the channel members serving to urge the latter apart and thereby apply a preload on the ball bearings 54. This biasing force will act throughout the life of the seat adjuster and serve to compensate for the problem of wear which might occur due to the ball bearings grooving or deforming the inner surfaces of the flanges they engage. Similarly and as mentioned above, manufacturing tolerances need not be held as closely as heretofore because of the continuous biasing force being provided by the rollers.

FIGS. 5 and 6 show a roller construction which is similar to those shown in FIGS. 1 through 4 except that a plastic expandable insert 76 is located interiorly of the roller 77 and is formed with a plurality of flex fingers 78 which are bent inwardly and apply a force acting radially outwardly on the inner surface of the roller. Although not essential, an insert member of this type can be utilized in conjunction with the roller when it is desired to make the latter from a thinner sheet of spring steel since it precludes the possibility of the roller becoming oval or out-of-round as a result of being compressed between the stop sections formed with the channel members.

FIG. 7 illustrates a further modification of the roller of FIGS. 1 through 4 and in this case it will be noted that the roller 80 has the peripheral surface 82 thereof spherical in configuration so that when assembled within the seat adjuster, point contact is provided between the roller and the bearing surfaces 56 and 58. There is the possibility that when the roller is formed as a cylinder of FIGS. 1 and 4 and as it rotates between the channels, a noise problem could occur as the tongues 72 and 74 move into and out of contact with the bearing surfaces 56 and 58. In such case, the roller configuration of FIG. 7 could eliminate such a problem as well as providing minimum contact engagement with the bearing surfaces and accordingly minimize friction therebetween.

Various changes and modifications can be made in this construction without departing from the spirit of the invention. Such changes and modifications are contemplated by the inventor and he does not wish to be limited except by the scope of the appended claims.

I claim:

1. A slidable track structure for a vehicle seat comprising in combination, a pair of longitudinal generally U-shaped relatively slidable channel members located in opposed relationship, each of said members having a base section providing a first bearing surface and formed with a pair of horizontally spaced sidewalls, the sidewalls of each of said channel members having laterally extending flanges, the laterally extending flanges of one of said channel members overlapping and located in opposed spaced relationship to the laterally extending flanges of the other of said channel members so as to provide pairs of opposed bearing surfaces, bearing means located between said opposed bearing surfaces of said laterally extending flanges, rotatable spring means located between the channel members and engaging the first bearing surface of each of said members for supporting the weight of said seat, said spring means taking the form of a split cylindrical roller made from a sheet of spring steel with the opposed end portions thereof located in spaced side-by-side overlapped relationship both axially and circumferentially of the roller so as to define a helical space, said end portions jointly providing a continuation of the outer surface of the roller, said roller having the outer peripheral surface thereof contacting the first bearing surface of each of said channel members and serving to continuously bias said channel members apart to thereby preload said bearing means, and a plastic expendable insert with a plurality of flex fingers located interiorly of the roller for applying a radially outwardly acting force on the inner surface of the roller.

2. The invention recited in claim 1 wherein the roller has a generally spherical outer peripheral surface.